(12) United States Patent (10) Patent No.: US 10,836,671 B2
Oozeki (45) Date of Patent: Nov. 17, 2020

(54) METHOD FOR MANUFACTURING GLASS INGOT

(71) Applicant: FUJIKURA LTD., Tokyo (JP)

(72) Inventor: Nobuo Oozeki, Sakura (JP)

(73) Assignee: Fujikura Ltd., Tokyo (JP)

( * ) Notice: Subject to any disclaimer, the term of this patent is extended or adjusted under 35 U.S.C. 154(b) by 170 days.

(21) Appl. No.: 16/080,632

(22) PCT Filed: Apr. 4, 2017

(86) PCT No.: PCT/JP2017/014079
§ 371 (c)(1),
(2) Date: Aug. 28, 2018

(87) PCT Pub. No.: WO2017/183443
PCT Pub. Date: Oct. 26, 2017

(65) Prior Publication Data
US 2019/0084866 A1 Mar. 21, 2019

(30) Foreign Application Priority Data
Apr. 19, 2016 (JP) .................. 2016-083502

(51) Int. Cl.
*C03B 37/018* (2006.01)
*C03B 37/027* (2006.01)
*C03B 19/14* (2006.01)
(52) U.S. Cl.
CPC ...... *C03B 37/01815* (2013.01); *C03B 37/018* (2013.01); *C03B 37/027* (2013.01);
(Continued)

(58) Field of Classification Search
None
See application file for complete search history.

(56) References Cited

U.S. PATENT DOCUMENTS

| 5,632,797 A * | 5/1997 | Williams ................. B01D 1/22 65/413 |
| 5,707,415 A | 1/1998 | Cain |

(Continued)

FOREIGN PATENT DOCUMENTS

| JP | H10-511923 A | 11/1998 |
| JP | 4158009 B2 | 10/2008 |

(Continued)

*Primary Examiner* — Lisa L Herring
(74) *Attorney, Agent, or Firm* — Osha Bergman Watanabe & Burton LLP

(57) ABSTRACT

A method for manufacturing a glass ingot includes preparing a supply system including a gasifier that gasifies a raw material compound and a burner that combusts the gasified raw material compound; adding an oxygen-containing gas to the raw material compound at a plurality of addition places including an upstream addition place located in the gasifier or on an upstream side of the gasifier and a downstream addition place located on a downstream side of the gasifier in which locations of the raw material compound in a flow direction are different in the supply system so as to form a raw material mixture; and adding the oxygen-containing gas at the upstream addition place so that a concentration of oxygen or a concentration of the raw material compound in the raw material mixture is not in a combustible range of the raw material mixture.

4 Claims, 2 Drawing Sheets

(52) U.S. Cl.
CPC ...... *C03B 19/1415* (2013.01); *C03B 2201/02* (2013.01); *C03B 2207/36* (2013.01); *C03B 2207/46* (2013.01); *C03B 2207/80* (2013.01)

(56) References Cited

U.S. PATENT DOCUMENTS

| | | |
|---|---|---|
| 5,922,100 A | 7/1999 | Cain et al. |
| 2003/0126889 A1 | 7/2003 | Otsuka et al. |
| 2014/0349830 A1* | 11/2014 | Trommer ............... C03B 37/014 501/32 |
| 2017/0037501 A1 | 2/2017 | Oozeki |
| 2018/0065879 A1* | 3/2018 | Otto .................... C03B 19/1415 |

FOREIGN PATENT DOCUMENTS

| | | |
|---|---|---|
| JP | 2012-162414 A | 8/2012 |
| JP | 2017-036172 A | 2/2017 |
| WO | 96/20897 A1 | 7/1996 |

* cited by examiner

METHOD FOR MANUFACTURING GLASS INGOT

CROSS-REFERENCE TO RELATED APPLICATIONS

The present application is a U.S. National Entry Stage of International Application No. PCT/JP2017/014079, filed on Apr. 4, 2017 which claims priority to Japanese Patent Application No. 2016-083502, filed on Apr. 19, 2016, the whole content of which being herein incorporated by reference for all purpose.

BACKGROUND

As a method for manufacturing a glass ingot such as a preform for an optical fiber, for example, there is a method in which a soot deposit is produced by depositing $SiO_2$ fine particles and is heated, thereby obtaining a glass ingot (for example, refer to Patent Document 1).

In the above-described manufacturing of a glass ingot, it is possible to use a manufacturing apparatus provided with a supply system having a burner that combusts a raw material gas and generates $SiO_2$. In the step of depositing $SiO_2$ fine particles (deposition step), a raw material gas including silicon is supplied to the burner, and $SiO_2$ fine particles generated in flame that is generated in the outlet of the burner are deposited on a target.

In the deposition step, when the flow rate of the raw material gas is increased, the amount of carbon soot in soot is likely to increase due to incomplete combustion, and thus it is not easy to increase the production rate. In order to obtain soot including no carbon, it is effective to add oxygen ($O_2$) as a combustion-supporting gas to the raw material gas.

PRIOR ART DOCUMENTS

Patent Documents

[Patent Document 1] Japanese Patent No. 4158009

In the above-described manufacturing method, oxygen ($O_2$) is added to the raw material gas, and thus it is necessary to prevent occurrences of backfire in the supply system during the ordinary operation of the supply system and during the pause of the raw material gas flow.

SUMMARY

One or more embodiments of the present invention provide a method for manufacturing a glass ingot which is capable of increasing the production rate and prevents occurrences of backfire in a supply system.

According to one or more embodiments of the present invention, there is provided a method for manufacturing a glass ingot, including: preparing a supply system including a gasifier that gasifies a raw material compound including an organic silicon compound supplied from a supply source and a burner that combusts the gasified raw material compound and generate $SiO_2$, adding an oxygen-containing gas to the raw material compound at a plurality of addition places including an upstream addition place located in the gasifier or on an upstream side of the gasifier and a downstream addition place located on a downstream side of the gasifier in which locations of the raw material compound in a flow direction are different in the supply system so as to form a raw material mixture, and adding the oxygen-containing gas at the upstream addition place so that a concentration of oxygen or a concentration of the raw material compound in the raw material mixture is not in a combustible range of the raw material mixture in an outlet of the gasifier.

In one or more embodiments of the present invention, a flow rate of the oxygen-containing gas to be added at the upstream addition place may be at least 3 standard liter per minute (SLM), and, in the outlet of the gasifier, a molar concentration of oxygen in the raw material mixture may be 9% or less or a molar concentration of the raw material compound in the raw material mixture may be 24% or more.

In one or more embodiments of the present invention, at the downstream addition place, the oxygen-containing gas may be added so that a ratio of a flow rate of the raw material mixture to the molar concentration of oxygen in terms of a standard state in the outlet of the burner reaches 3.0 m/s-% or less.

In one or more embodiments of the present invention, the concentration of oxygen in the raw material mixture in the outlet of the burner may be lower than the concentration of oxygen necessary to completely combust the raw material compound.

In one or more embodiments of the present invention, the glass ingot may be an optical fiber preform.

According to one or more embodiments of the present invention, oxygen ($O_2$) is added to the raw material compound through an upstream addition flow path and a downstream addition flow path. Therefore, the raw material mixture including oxygen has been sufficiently mixed and homogenized at the time of being emitted from the burner, and an oxidation and combustion reaction of the raw material compound proceeds with no delay. Therefore, incomplete combustion does not easily occur even when the flow rate of the raw material mixture is increased. Therefore, compared with manufacturing methods in which no oxygen is added, it is possible to increase the flow rate of the raw material mixture and increase the production rate.

According to one or more embodiments of the present invention, the amount of the oxygen-containing gas to be added through the upstream addition flow path is determined such that the concentration of oxygen or the concentration of the raw material in the raw material mixture is not in the combustible range in the outlet of the gasifier. Therefore, even when the flow of the raw material mixture stops and backfire (for example, combustion in the flow path) occurs due to any reasons, backfire does not reach the gasifier or the upstream side of the gasifier. In addition, during the ordinary operation of the supply system, similarly, backfire does not reach the gasifier or the upstream side of the gasifier.

DETAILED DESCRIPTION OF THE EMBODIMENTS

Hereinafter, one or more embodiments of the present invention will be described with reference to drawings.

Apparatus for Manufacturing Glass Preform (Glass Ingot)

Figure 1A:
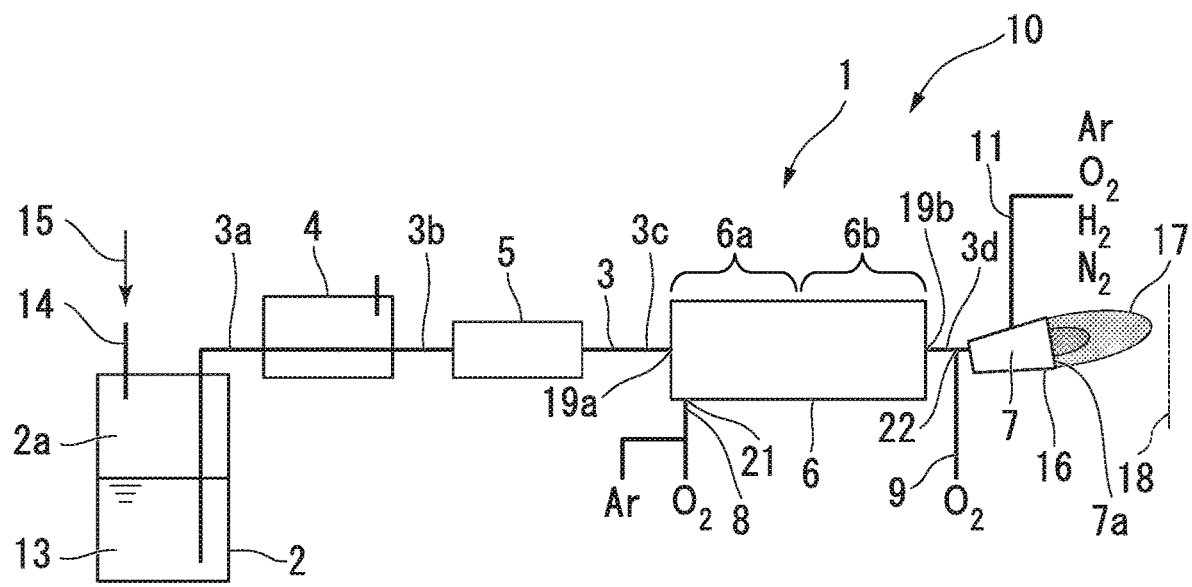
FIG. 1A is a view schematically showing a supply system in a manufacturing apparatus that can be used in a method for manufacturing a glass ingot according to one or more embodiments of the present invention.
Figure 1B:
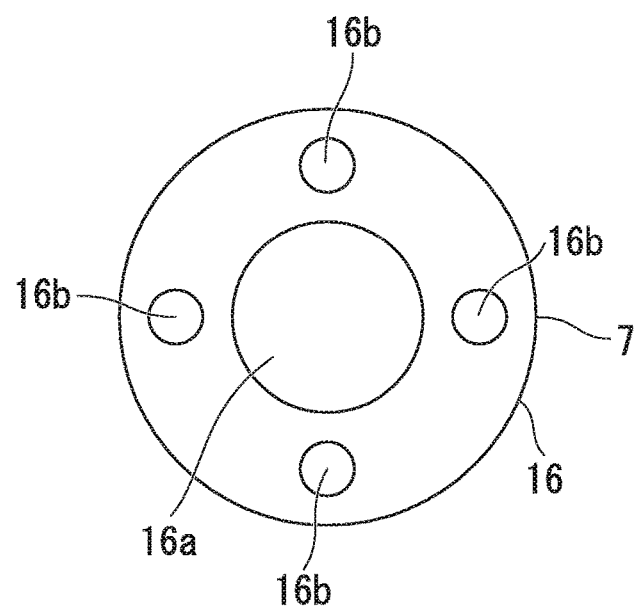
FIG. 1B is a view schematically showing a structure of a burner in the manufacturing apparatus of FIG. 1A according to one or more embodiments of the present invention.

FIG. 1A is a view schematically showing a supply system 1 in a manufacturing apparatus 10 that can be used in a method for manufacturing a glass preform (glass ingot) according to one or more embodiments of the present invention. FIG. 1B is a view schematically showing a structure of a burner 7 in the manufacturing apparatus 10.

As shown in FIG. 1A, the supply system 1 includes a liquid container 2 (supply source), a main flow path 3, a deaeration portion 4, a mass flow controller 5, a gasifier 6, a burner 7, a upstream addition flow path 8, a downstream addition flow path 9, and a fuel gas flow path 11. The liquid container 2, the main flow path 3, the deaeration portion 4, the mass flow controller 5, the gasifier 6, and the burner 7 are arranged in this order from an upstream side toward a downstream side in a flow direction of a raw material compound 13.

The liquid container 2 is capable of storing the liquid-form raw material compound 13. The liquid container 2 has an airtight structure, and an inner space 2a can be pressurized by introducing a pressurization gas 15 thereinto through a gas supply portion 14. Meanwhile, hereinafter, there will be cases in which the raw material compound is simply referred to as the raw material.

The main flow path 3 is capable of leading the raw material compound 13 in the liquid container 2 to the burner 7 through the deaeration portion 4, the mass flow controller 5, and the gasifier 6.

The main flow path 3 has a first flow path 3a, a second flow path 3b, a third flow path 3c, and a fourth flow path 3d. The first flow path 3a leads the raw material compound 13 in the liquid container 2 to the deaeration portion 4. The second flow path 3b leads the raw material compound 13 that has passed through the deaeration portion 4 to the mass flow controller 5. The third flow path 3c leads the raw material compound 13 that has passed through the mass flow controller 5 to the gasifier 6. The fourth flow path 3d leads the raw material compound 13 that has passed through the gasifier 6 to the burner 7.

The deaeration portion 4 is capable of deaerating dissolved gas from the raw material compound 13 by depressurization or the like.

The mass flow controller 5 is capable of controlling the flow rate of the raw material compound 13.

The gasifier 6 is capable of gasifying the liquid-form raw material compound 13 by heating or the like. The third flow path 3c is connected to an introduction end 19a which is one end portion of the gasifier 6. The fourth flow path 3d is connected to a derivation end 19b which is the other end portion of the gasifier 6.

The burner 7 has a nozzle 16. As shown in FIG. 1B, the nozzle 16 has a raw material flow path 16a and a plurality of fuel flow paths 16b. In the raw material flow path 16a, a gas mixture supplied from the main flow path 3 flows. In the plurality of fuel flow paths 16b, a fuel gas supplied from the fuel gas flow path 11 flow. The raw material flow path 16a and the fuel flow paths 16b are formed independently from each other. The fuel flow paths 16b are located on, for example, an outer circumferential side of the raw material flow path 16a.

The upstream addition flow path 8 is connected to the gasifier 6 and is capable of adding an oxygen-containing gas to the raw material compound 13 in the gasifier 6. A place to which the upstream addition flow path 8 is connected is referred to as an upstream addition place 21. The oxygen-containing gas is a gas containing oxygen ($O_2$). The upstream addition flow path 8 is preferably connected to an upstream-side portion 6a of the gasifier 6. The upstream-side portion 6a refers to a portion on the upstream side of the center in the flow direction of the raw material compound 13. A portion on the downstream side of the gasifier 6 in the flow direction of the raw material compound 13 is referred to as a downstream-side portion 6b.

Meanwhile, in the manufacturing apparatus 10 shown in FIG. 1A, the upstream addition flow path 8 is connected to the gasifier 6; however, the connection place of the upstream addition flow path 8 may be the gasifier 6 or a place located on the upstream side of the gasifier 6. For example, the connection place of the upstream addition flow path 8 may be the downstream-side portion 6b of the gasifier 6 or may be the second flow path 3b, the third flow path 3c, or the like.

In addition, the number of upstream addition flow paths is not limited to one and may be more than one. For example, a first upstream addition flow path may be connected to the third flow path 3c, and a second upstream addition flow path may be connected to the gasifier 6.

The downstream addition flow path 9 is connected to the fourth flow path 3d and is capable of adding an oxygen-containing gas to the gas mixture in the fourth flow path 3d. A place in which the downstream addition flow path 9 is connected to the fourth flow path 3d is referred to as a downstream addition place 22.

Meanwhile, in the manufacturing apparatus 10 shown in FIG. 1A, the downstream addition flow path 9 is connected to the fourth flow path 3d; however, the connection place of the downstream addition flow path 9 may be a place located on the downstream side of the gasifier 6. For example, the connection place of the downstream addition flow path 9 may be the burner 7.

In addition, the number of downstream addition flow paths is not limited to one and may be more than one. For example, a first downstream addition flow path may be connected to the fourth flow path 3d, and a second downstream addition flow path may be connected to the burner 7.

Method for Manufacturing Glass Preform (Glass Ingot)

Next, a method for manufacturing a glass preform (glass ingot) of the present embodiment will be described using a case in which the manufacturing apparatus 10 shown in FIG. 1A is used as an example.

Examples of the raw material compound 13 that is stored in the liquid container 2 include organic silicon compounds such as alkylsilane, alkoxysilane, alkylsiloxane, and alkylcyclosiloxane.

Examples of alkylsilane include tetraalkylsilane.

Examples of alkoxysilane include tetraalkoxysilane such as tetramethoxysilane; and alkylalkoysilane such as methyltrimethoxysilane.

Examples of alkylsiloxane include hexamethyldisiloxane.

Examples of alkylcyclosiloxane include hexamethylcyclotrisiloxane, tetramethylcyclotrisiloxane, octamethylcyclotetrasiloxane (OMCTS), and decamethylcyclopentasiloxane.

Among these, OMCTS is particularly preferred. The raw material compound 13 stored in the liquid container 2 is a liquid.

The inner space 2a of the liquid container 2 is pressurized by introducing the pressurization gas 15 (for example, nitrogen ($N_2$)) into the liquid container 2 through the gas supply portion 14. Therefore, the raw material compound 13 is derived from the liquid container 2 through the main flow path 3 (the first flow path 3a) and introduced into the deaeration portion 4.

In the deaeration portion 4, dissolved gas is deaerated from the raw material compound 13.

The raw material compound 13 that has passed through the deaeration portion 4 is introduced into the mass flow controller 5 through the main flow path 3 (the second flow path 3b). After the flow rate of the raw material compound is controlled using the mass flow controller 5, the raw material compound 13 is led to the gasifier 6 through the main flow path 3 (the third flow path 3c). The raw material compound 13 is gasified in the gasifier 6 by heating or the like. Hereinafter, there will be cases in which the gasified raw material compound 13 is referred to as a raw material gas.

In the gasifier 6, an oxygen-containing gas including oxygen ($O_2$) is added to the raw material compound 13 through the upstream addition flow path 8. Due to the addition of the oxygen-containing gas, the raw material compound 13 turns into a gas mixture including oxygen ($O_2$) (raw material mixture).

The flow rate of the oxygen-containing gas to be added through the upstream addition flow path 8 is preferably at least 3 SLM. When the flow rate of the oxygen-containing gas is preferably at least 3 SLM or more, it is possible to increase the flow rate of the gas mixture that is emitted from the raw material flow path 16a in the burner 7. Therefore, it is possible to prevent easy occurrences of backfire. The backfire refers to the fact that flame 17 from the burner 7 enters an inside of the supply system 1 and combusts the raw material compound and refers to, for example, combustion in the flow path.

The oxygen-containing gas may be an oxygen ($O_2$) gas or a gas mixture including oxygen ($O_2$) and an additional gas. The additional gas is, for example, an inert gas such as Ar or nitrogen ($N_2$), and this gas is capable of playing a role of a carrier gas and thus stabilizing the flow rate of the raw material gas.

The amount of the oxygen-containing gas to be added through the upstream addition flow path 8 is determined such that the concentration of oxygen or the concentration of the raw material in the gas mixture is not in a combustible range in the derivation end 19b (outlet) of the gasifier 6. The present inventors repeated studies regarding the combustion of the gas mixture and consequently found that, when the molar concentration of oxygen in the gas mixture is 9% or less or the molar concentration of the raw material (the molar concentration of the raw material compound) is 24% or more, the gas mixture is in the combustible range.

When the molar concentration of oxygen in the gas mixture is 9% or less, there is a lack of oxygen, and the gas mixture does not combust even in the case of coming into contact with a heat source. When the molar concentration of the raw material in the gas mixture is 24% or more, the concentration of the raw material is above the combustible range, and thus the gas mixture does not combust even in the case of coming into contact with a heat source. When the molar concentration of oxygen in the gas mixture is 9% or less or the molar concentration of the raw material is 24% or more, it is possible to prevent backfire. Meanwhile, the molar concentration at which OMCTS can be combusted is 0.5% to 24%.

In order to increase the production rate of a glass preform (glass ingot) in the oxygen-containing gas to be added through the upstream addition flow path 8, the concentration of the carrier gas (for example, Ar or nitrogen ($N_2$)) is preferably low. Therefore, the concentration of oxygen ($O_2$) in the oxygen-containing gas is desirably high to a certain extent. The concentration of oxygen ($O_2$) in the oxygen-containing gas can be determined so that the molar concentration of oxygen in the gas mixture reaches, for example, 0.1% or more in the derivation end 19b (outlet) of the gasifier 6. Therefore, it is possible to stabilize the flow rate of the raw material gas, relatively increase the concentration of the raw material in the gas mixture, and improve the production rate.

The molar concentration of the raw material in the gas mixture is preferably less than 85%.

Figure 2:
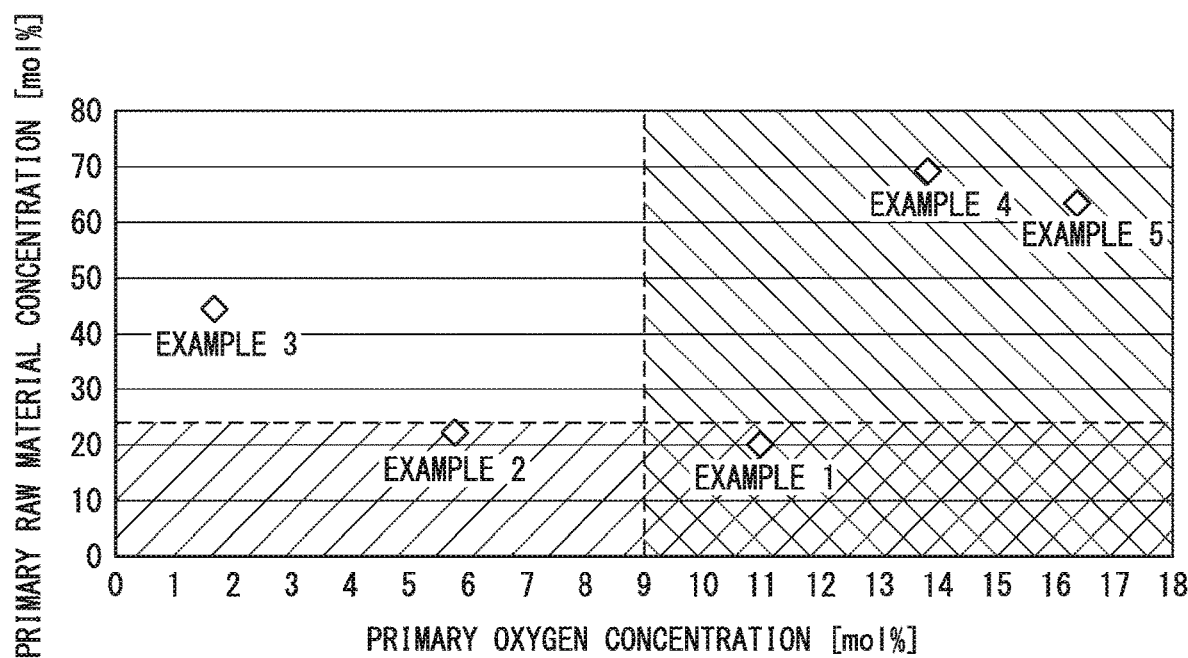
FIG. 2 is a view showing examples of a primary oxygen concentration and a primary raw material concentration of a gas mixture according to one or more embodiments of the present invention.

Examples of the concentration of oxygen and the concentration of the raw material in the gas mixture in the gasifier 6 are shown in FIG. 2 and Table 1. The molar concentration of oxygen in the gas mixture is referred to as a primary oxygen concentration, and the molar concentration of the raw material is referred to as a primary raw material concentration. Meanwhile, the concentration of oxygen and the concentration of the raw material in the gas mixture in the gasifier 6 are the same as the concentration of oxygen and the concentration of the raw material in the gas mixture in the derivation end 19b (outlet) of the gasifier 6.

TABLE 1

|  | Primary oxygen concentration [mol %] | Primary raw material concentration [mol %] | Secondary oxygen concentration [mol %] | Secondary raw material concentration [mol %] | Possibility of flame backflow during backfire |
|---|---|---|---|---|---|
| Example 1 | 11 | 20.5 | 44 | 13 | Yes |
| Example 2 | 5.8 | 21.7 | 44 | 13 | No |
| Example 3 | 1.7 | 44.3 | 71.1 | 13 | No |
| Example 4 | 13.8 | 69.0 | 83.7 | 13 | No |
| Example 5 | 16.3 | 63.3 | 90.2 | 7.4 | Yes |

FIG. 2 and Table 1 show that, in Example 1, the primary oxygen concentration exceeds 9%, and the primary raw material concentration is less than 24%, and thus the gas mixture is in the combustible range. In Example 2, the primary raw material concentration is less than 24%; however, the primary oxygen concentration is 9% or less, and thus the gas mixture does not combust. In Example 3, the primary oxygen concentration is 9% or less, and the primary raw material concentration is 24% or more, and thus the gas mixture does not combust. In Examples 4 and 5, the primary oxygen concentration exceeds 9%; however, the primary raw material concentration is 24% or more, and thus the gas mixture does not combust.

The gas mixture that has passed through the gasifier 6 is emitted from the raw material flow path 16a in the burner 7 through the main flow path 3 (the fourth flow path 3d) (refer to FIG. 1B).

In the fourth flow path 3d, an oxygen-containing gas is added to the gas mixture through the downstream addition flow path 9. Due to the addition of the oxygen-containing gas, the concentration of oxygen in the gas mixture increases. The oxygen-containing gas may be an oxygen ($O_2$) gas or a gas including oxygen ($O_2$) and the above-described carrier gas.

The concentration of oxygen in the gas mixture in an outlet 7a (an outflow opening of the raw material flow path 16a) of the burner 7 is preferably lower than a concentration of oxygen necessary to completely combust the raw material (a concentration at which the oxygen adequacy ratio reaches 100%). The concentration of oxygen in the gas mixture is preferably, for example, a concentration corresponding to 30% to 40% of the concentration of oxygen necessary to completely combust the raw material.

When the concentration of oxygen in the gas mixture is set to be lower than the concentration of oxygen necessary to completely combust the raw material, it is possible to prevent easy occurrences of backfire.

The ratio (the flow rate/the concentration of oxygen) of the flow rate (m/s) of the gas mixture to the molar concentration of oxygen (%) in the standard state (0° C., 1 atm) in the outlet 7a (the outflow opening of the raw material flow path 16a) of the burner 7 is preferably 3.0 m/s-% or less. When the ratio (the flow rate/the concentration of oxygen) is set to 3.0 m/s-% or less, it is possible to prevent easy occurrences of backfire.

Meanwhile, 1 atm is $1.01325 \times 10^5$ Pa.

Figure 3:
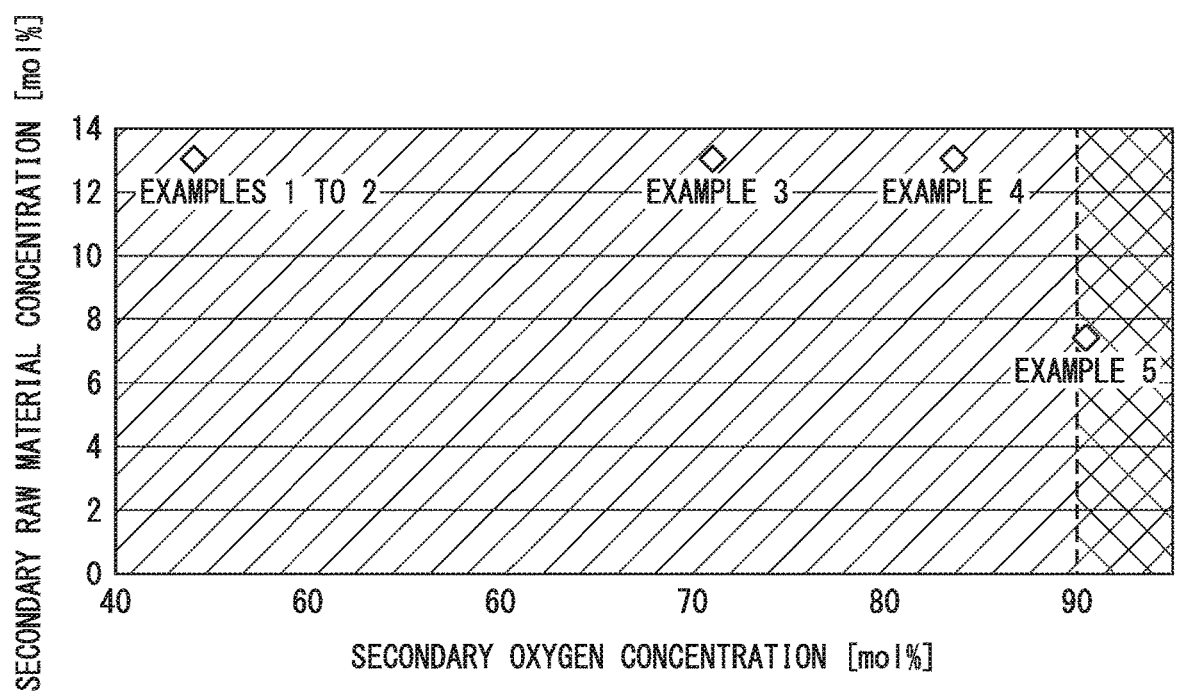
FIG. 3 is a view showing examples of a secondary oxygen concentration and a secondary raw material concentration of the gas mixture according to one or more embodiments of the present invention.

Examples of the concentration of oxygen and the concentration of the raw material in the gas mixture in the outlet 7a (the outflow opening of the raw material flow path 16a) of the burner 7 are shown in FIG. 3 and Table 1. The concentration of oxygen in the gas mixture is referred to as a secondary oxygen concentration, and the concentration of the raw material is referred to as a secondary raw material concentration.

FIG. 3 and Table 1 show that, in Examples 1 to 4, the secondary raw material concentration is in the combustible range; however, the secondary oxygen concentration is low, and thus the gas mixture does not combust. In Example 5, the secondary oxygen concentration is high, and the secondary raw material concentration is also in the combustible range, and thus the gas mixture is combustible.

As shown in FIG. 1B, to the gas mixture emitted from the outflow opening of the raw material flow path 16a, a fuel gas including oxygen ($O_2$) emitted from the outflow opening of the fuel flow path 16b is mixed. Therefore, the oxygen adequacy ratio reaches 100% or more. Meanwhile, regarding the concentration of oxygen in the emitted gas mixture, the oxygen adequacy ratio may reach 100% or more due to oxygen in the atmosphere.

As shown in FIG. 1A, in the burner 7, the gas mixture emitted from the raw material flow path 16a combusts together with the fuel gas emitted from the fuel flow path 16b, and the flame 17 generated in the outlet 7a of the burner 7 faces a soot deposit 18. Therefore, $SiO_2$ fine particles generated in the flame 17 are deposited on the surface of the soot deposit 18 and are subjected to a heating step, thereby obtaining a glass preform (glass ingot).

In the manufacturing method of the present embodiment, oxygen ($O_2$) is added to the raw material compound 13 through the upstream addition flow path 8 and the downstream addition flow path 9. Therefore, the gas mixture including oxygen has been sufficiently mixed and homogenized at the time of being emitted from the burner 7, and an oxidation and combustion reaction of the raw material compound proceeds with no delay. Therefore, incomplete combustion does not easily occur even when the flow rate of the gas mixture is increased. Therefore, compared with manufacturing methods in which no oxygen is added, it is possible to increase the flow rate of the gas mixture and increase the production rate.

In the manufacturing method of the present embodiment, the oxygen-containing gas is added to the gas mixture through the upstream addition flow path 8 so that the concentration of oxygen or the concentration of the raw material in the gas mixture is not in the combustible range in the derivation end (outlet) 19b of the gasifier 6. Therefore, even when the flow of the gas mixture stops and backfire (for example, combustion in the flow path) occurs for any reason, backfire does not reach the gasifier 6 or the upstream side of the gasifier. In addition, during the ordinary operation of the supply system 1, similarly, backfire does not reach the gasifier 6 or the upstream side of the gasifier.

Hitherto, one or more embodiments of the present invention have been described; however, other modifications can be carried out within the scope of the present invention.

A glass ingot that is manufactured using the manufacturing method of one or more embodiments of the present invention can be applied to, for example, optical fiber preforms, lenses, optical glass, optical components, and the like.

DESCRIPTION OF REFERENCE NUMERALS

1: Supply System
2: Liquid Container (Supply Source)
6: Gasifier
7: Burner
7a: Outlet of Burner
19b: Derivation End (Outlet of Gasifier)
21: Upstream Addition Place
22: Downstream Addition Place Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for manufacturing a glass ingot, the method comprising:
    preparing a supply system comprising:
        a gasifier that gasifies a raw material compound comprising an organic silicon compound supplied from a supply source; and
        a burner that combusts the gasified raw material compound to generate $SiO_2$;
    adding an oxygen-containing gas to the raw material compound at a plurality of addition places comprising:
        an upstream addition place located in the gasifier or on an upstream side of the gasifier; and
        a downstream addition place located on a downstream side of the gasifier in which locations of the raw material compound in a flow direction are different in the supply system so as to form a raw material mixture; and
    adding the oxygen-containing gas at the upstream addition place such that a concentration of oxygen or a concentration of the raw material compound in the raw material mixture is not in a combustible range of the raw material mixture in an outlet of the gasifier,
    wherein, at the downstream addition place, the oxygen-containing gas is added such that a ratio of a flow rate of the raw material mixture to the molar concentration of oxygen in terms of a standard state in an outlet of the burner reaches 3.0 m/s-% or less.

2. The method for manufacturing a glass ingot according to claim 1, wherein a flow rate of the oxygen-containing gas to be added at the upstream addition place is at least 3 SLM, and, in the outlet of the gasifier, a molar concentration of oxygen in the raw material mixture is 9% or less or a molar concentration of the raw material compound in the raw material mixture is 24% or more.

3. The method for manufacturing a glass ingot according to claim 1, wherein the concentration of oxygen in the raw material mixture in the outlet of the burner is lower than a concentration of oxygen necessary to completely combust the raw material compound.

4. The method for manufacturing a glass ingot according to claim 1, wherein the glass ingot is an optical fiber preform.

* * * * *